United States Patent [19]

Devensky et al.

[11] Patent Number: 4,617,678

[45] Date of Patent: Oct. 14, 1986

[54] APPARATUS FOR DETECTING AND RECOVERING BINARY DATA FROM AN INPUT SIGNAL

[75] Inventors: Walter L. Devensky; Carlos M. Dube, both of Boca Raton, Fla.

[73] Assignee: Allied Corporation, Morristown, N.J.

[21] Appl. No.: 635,372

[22] Filed: Jul. 27, 1984

[51] Int. Cl.[4] .......................... H04B 1/10; H04L 7/02
[52] U.S. Cl. ..................................... 375/102; 307/269; 307/517; 307/518; 328/63; 328/109; 375/104; 375/110; 377/44
[58] Field of Search ................ 375/102, 104, 108, 75, 375/110; 455/212, 218, 221, 225, 304, 303; 381/94; 307/517, 518, 269; 328/109, 63; 377/44, 107; 360/51

[56] References Cited

U.S. PATENT DOCUMENTS

| | | | |
|---|---|---|---|
| 3,209,265 | 9/1965 | Baker et al. | 328/63 |
| 3,437,937 | 4/1969 | Warfield | 455/221 |
| 3,566,095 | 2/1971 | Schmitz | 328/63 |
| 3,633,112 | 1/1972 | Anderson | 455/221 |
| 3,789,303 | 1/1974 | Hoffman et al. | 375/108 |
| 3,851,257 | 11/1974 | Boersma | 377/44 |
| 3,852,811 | 12/1974 | Aghazadeh | 360/51 |
| 3,865,981 | 2/1975 | Welch et al. | 328/63 |
| 3,902,123 | 8/1975 | Oomen | 455/221 |
| 3,949,301 | 4/1976 | Mattei | 455/222 |
| 4,068,180 | 1/1978 | Nelligan | 307/518 |
| 4,197,502 | 4/1980 | Sumner et al. | 375/75 |
| 4,245,192 | 1/1981 | Whiffen | 328/109 |
| 4,280,099 | 7/1981 | Rattlingourd | 328/63 |
| 4,344,175 | 8/1982 | Leslie | 455/218 |
| 4,426,714 | 1/1984 | Ashida | 375/110 |
| 4,450,573 | 5/1984 | Noble | 455/218 |

FOREIGN PATENT DOCUMENTS 0022134  3/1981  Japan ..................... 375/110

Primary Examiner—Marc E. Bookbinder
Attorney, Agent, or Firm—Robert M. Trepp; Bruce L. Lamb

[57] ABSTRACT

A circuit is described for recovering binary data from an input signal which may be phase coded and received intermittently and nonsynchronously incorporating an edge detector for detecting transitions of the data from a 0 to a 1, a counter which may be reset upon detection of a data transition, a second counter which may be reset upon the first counter reaching a predetermined value, the second counter being permitted to free run up to a predetermined value, a circuit for generating data in synchronous with the output of the second counter, and a squelch circuit for inhibiting the output of the generated data in response to output of the counters.

20 Claims, 2 Drawing Figures

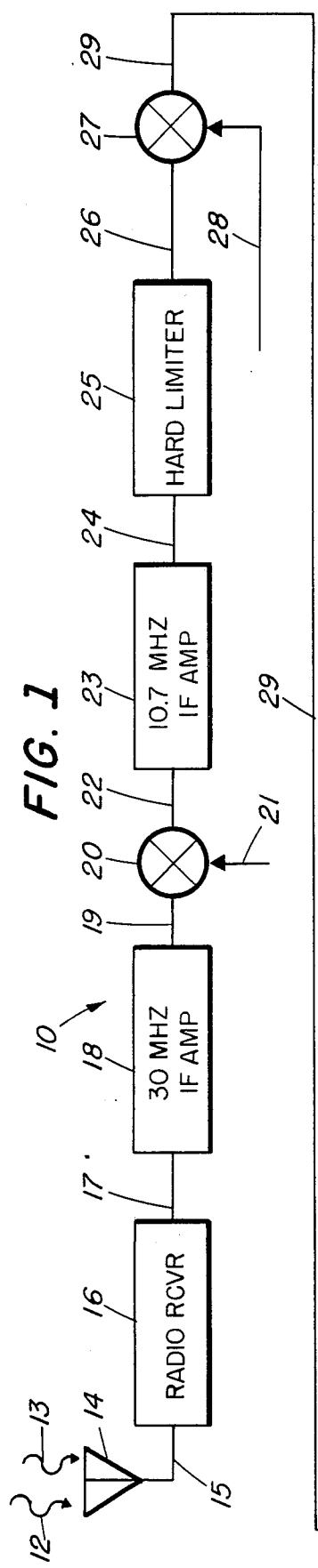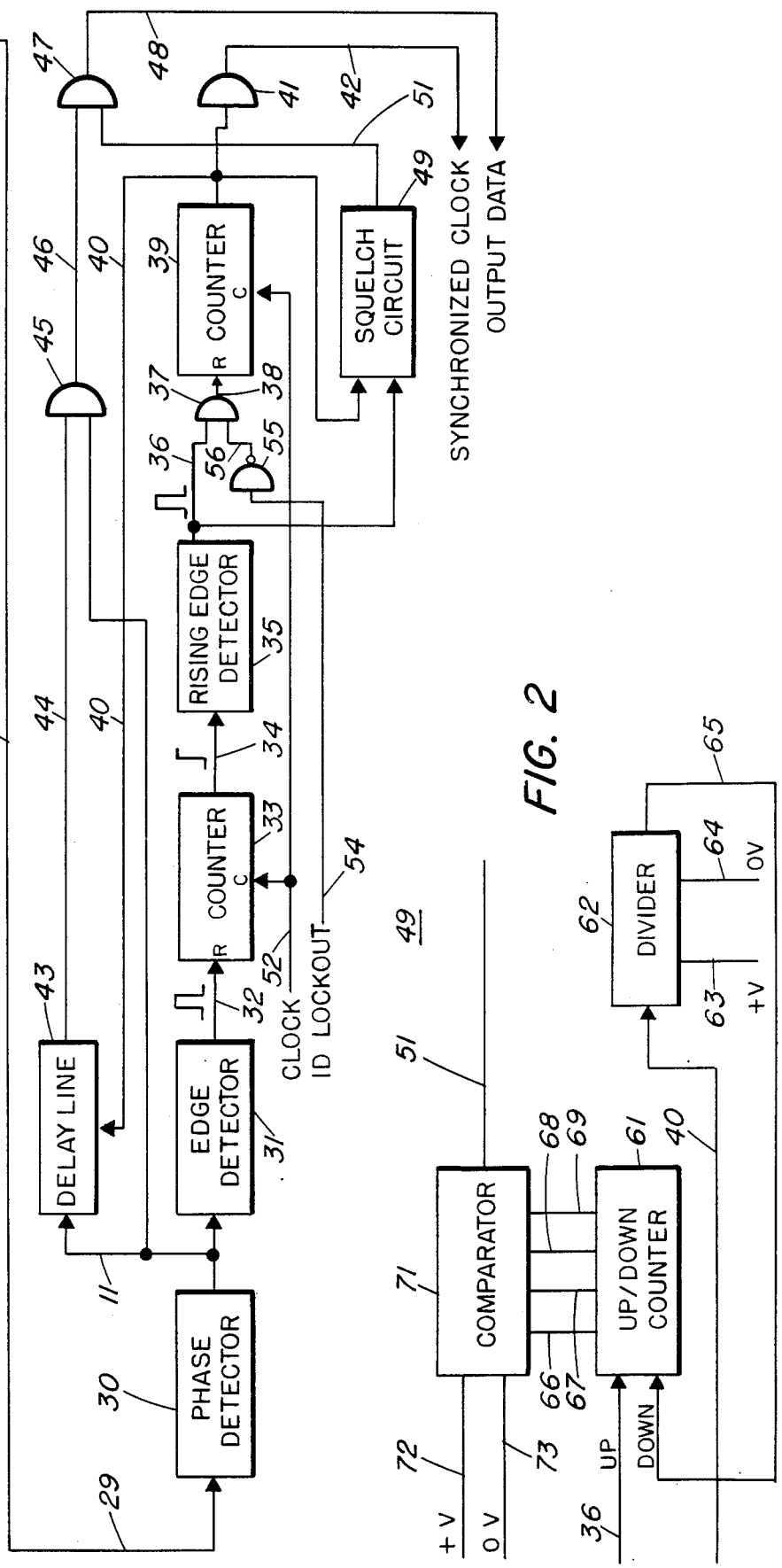

APPARATUS FOR DETECTING AND RECOVERING BINARY DATA FROM AN INPUT SIGNAL

BACKGROUND OF THE INVENTION

1. Field of the Invention

This invention relates to apparatus for detecting and recovering binary data from an input signal and more particularly to deriving a synchronized clock from an input signal which is received intermittently in the presence of noise and for inhibiting the output of detected binary data as a function of the noise to eliminate false or unreliable data.

2. Description of the Prior Art

Binary data may be sent to an aircraft in the form of a radio signal at a fixed frequency with phase modulation. One example of phased modulation is differentially phase shift keyed (DPSK) modulation. In DPSK modulation, the data is encoded prior to transmission and is decoded upon reception by comparing two successive encoded data bits. Each encoded data bit has a predetermined time interval and has a phase relationship depended upon whether a one or zero is represented.

In order to recover the binary data from an encoded DPSK data stream, a synchronized clock must be generated from the received signal if not independently available. Obtaining a synchronized clock may be difficult in an aircraft environment where the distance from the source of radio signals may result in a low signal level compared to other received signals. Furthermore, erroneous data will be decoded if an unsynchronized clock is inadvertently generated such as from noise or interferring signals or where a synchronized clock continues to decode apparent data after the data transmission has terminated.

An alternative approach for decoding DPSk data is by using a large shift register with a high speed nonsynchronized clock. This approach is costly in terms of hardware to implement.

It is therefore desirable to provide a circuit for recovering binary data from an input signal by generating a synchronized clock from the input signal by sensing the transitions between ones and zeros of the transmitted data and resetting a counter in response to detected transitions and having its output used to reset a second counter wherein the output of the second counter is synchronized with the binary data.

It is further desirable to provide a synchronous clock from the input signal that will continue after the input signal has terminated for at least one data time interval.

It is further desirable to provide a squelch circuit for inhibiting the decoded binary data as a function of the noise on the input signal.

It is further desirable to provide a squelch circuit for inhibiting the apparent decoded data at times when no data is in fact being received by detecting the output of the intermediate frequency amplifier of a receiver after hard limiting.

SUMMARY OF THE INVENTION

An apparatus and method is described for recovering binary data from an input signal wherein each bit of the data has a predetermined time interval and wherein first and second voltage levels represent a one and zero of the data respectively comprising a circuit for deriving a synchronized clock from the input signal including a first edge detector adapted for coupling to the input signal for detecting transitions between the first and second voltage levels and for generating an output signal in response to the detected transitions, a first counter having a clock input, a reset input, an output and interconnected to reset after counting up to a first predetermined value, the output signal of the first edge detector coupled to the reset input of the first counter for resetting the first counter at times a transition is detected, a second counter having a clock input, a reset input, an output and interconnected to reset after counting up to a second predetermined value, the output of the first counter coupled to the reset input of the second counter for resetting the second counter at times the first counter reaches a third predetermined value, the clock input of the first and second counters adapted for coupling to a clock signal of a predetermined frequency, a gate for gating the output of the second counter with the input signal to generate binary data from the input signal, and a squelch circuit for inhibiting the output of the generated binary data as a function of the output of the first and second counters indicative of unreliable data.

The invention further provides a receiver having an intermediate frequency amplifier of a predetermined bandwidth coupled to a hard limiter circuit and a phase detector for generating at times no desired signal is received voltage transitions at a frequency related to the bandwidth of the intermediate frequency amplifier and wherein the frequency of the voltage transitions are above the frequency of the voltage transitions of a desired input signal.

BRIEF DESCRIPTION OF THE DRAWING

FIG. 1 is a schematic diagram of one embodiment of the invention.

FIG. 2 is a schematic diagram of one embodiment of a squelch circuit shown in FIG. 1.

DESCRIPTION OF THE PREFERRED EMBODIMENT

Referring to FIG. 1, a schematic circuit 10 is shown for recovering binary data from an input signal. As shown in FIG. 1, radio signals as shown by the arrows 12 and 13, may be received by antenna 14. The radio signals are coupled over line 15 to an input of radio or microwave receiver 16. The output of radio receiver 16 is coupled over line 17 to an input of intermediate frequency amplifier 18. Intermediate frequency amplifier 18 may amplify signals at a frequency of 30 megahertz in a bandwidth of a 120 kilohertz. The output of intermediate frequency amplifier 18 is coupled over line 19 to an input of mixer 20. A second input on line 21 has a frequency suitable to provide an output on line 22 of mixer 20 at 10.7 megahertz. Line 22 is coupled to input of intermediate frequency amplifier 23 which may have a voltage gain, for example, of 100,000. The output of intermediate frequency amplifier 23 is coupled over line 24 to an input of hard limiter 25. Hard limiter 25 may, for example, limit the voltage excursions on line 24 to 1 volt. The output of hard limiter 25 is coupled over line 26 to an input of mixer 27. Alternatively, hard limiter 25 may be interchanged with mixer 27 so that mixer 27 precedes hand limiter 25 in the input signal path. Mixer 27 has a second input on line 28 having a frequency suitable for providing an output on line 29 from mixer 27 of 460 kilohertz. The output of mixer 27 is coupled over line 29 to the input of phase detector 30. Phase detector 30, which may include a phase locked loop, functions to detect the phase of the desired signal on line 29 and to provide an output signal indicative of the phase detected. For example, the output of phase detector 30 on line 11 may be at a first or second voltage depending upon the phase detected by phase detector 30. If radio signals 12 and 13 are phase modulated such as differential phase shift keyed, then the phase will be shifted 0 or 180 degrees representative of a binary 0 or 1, respectively.

Intermediate frequency amplifier 23 and hard limiter 25 function to amplify and limit received radio signals 12 and 13 to provide clear phase transitions for phase detector 30. In the absence of radio signals 12 and 13, intermediate frequency amplifier 23 and hard limiter 25 function to provide phase transitions as a function of the amplified moise in the bandwidth of intermediate frequency amplifiers 18 and 23. By selecting the bandwidth of intermediate frequency amplifier 18 and 23, the random frequency of the voltage and phase transitions at the output of hard limiter 25 may be determined. Phase detector 30 will provide an output signal on line 11 having many voltage transitions occurring at a frequency above the desired input signal which will be indicative of receiving no radio signals 12 and 13.

The output of phase detector 30 is coupled over line 11 to an input of edge detector 31. Edge detector 31 functions to provide a predetermined pulse in response to the output of phase detector 30 going from a first voltage to a second voltage or vice versa. The output of edge detector 31 is coupled over line 32 to the reset input of counter 33. Counter 33 is interconnected to reset after counting up to predetermined value in response to clock pulses coupled to a clock input on line 52 or counter 33 is reset by edge detector 31. An output of counter 33 occurs at a predetermined count and is coupled over line 34 to an input of rising edge detector 35. Rising edge detector 35 functions to detect the leading edge of the output pulse on line 34 and to provide an output pulse on line 36 in response to detection of a rising edge. Line 36 is coupled to an input of AND gate 37. The output of AND gate 37 is coupled over line 38 to a reset input of counter 39. Counter 39 has a clock input coupled to line 52 and an output on line 40 which occurs at a predetermined count in counter 39. The output of counter 39 on line 40 functions as a synchronized clock and is coupled to an input of AND gate 41 having its output coupled over line 42. Counter 39 is interconnected to reset after counting up to a predetermined value such as 64 microseconds which corresponds to the time interval of a bit of data in the input signal on line 11.

A control signal ID lockout is coupled over line 54 to an input NAND gate 55. The output of NAND gate 55 is coupled over line 56 to a second input of AND gate 37. Control signal ID LOCKOUT when a 1 prevents the output signal on line 36 from resetting counter 39. Thus control signal ID LOCKOUT permits counter 39 to free run after initially being synchronized to the data signal.

In order to decode differential phase shift keyed data, a one bit delay line 43 has an input coupled to line 11 for receiving encoded data. The output of counter 39 is coupled over line 40 to the clock input of delay line 43. Delay line 43 functions to store the data on line 11 in delay line 43 for one time interval of a bit of data. The output of delay line 43 is coupled over line 44 to an input of AND gate 45. Line 11 containing the encoded data is also coupled to a second input of AND gate 45. The output of AND gate 45 is coupled over line 46 to an input of AND gate 47. AND gate 45 functions to compare 2 successive bits of data and to provide output data on line 46. The output data on line 46 is in turn gated through AND gate 47 to line 48.

In order to prevent false data from being provided on line 48 either due to noise or an unsynchronized clock, a squelch circuit 49 is provided. The output of rising edge detector 35 is coupled over line 36 to an input of squelch circuit 49. The output of counter 39 is coupled over line 40 to an input of squelch circuit 49. Squelch circuit 49 may, for example, provide an output as a function of the rate or frequency of pulses on line 36 representative of the output of counter 33 and the frequency or rate of pulses from counter 39. One such function may be the ratio of the frequency of rising edges from counter 33 to the frequency of rising edges from counter 39. When the ratio goes below a predetermined constant K, the output of squelch circuit 49 on line 51 will go low which will inhibit the output data signal on line 46 from passing through AND gate 47. Line 51 is coupled to a second input of AND gate 47. When the value of constant k goes above a predetermined number, then the output of squelch circuit 49 on line 51 will go high permitting output data on line 48.

In operation for deriving the synchronous clock from the data signals on line 11, edge detector 31 provides a pulse indicative of a change of phase of the data signal at phase detector 30. The data signal has a data rate typically of 15.625 kilohertz with uniform bit intervals of 64 microseconds. Upon a pulse from edge detector 31, counter 33 is reset, for example, to all zeros. Counter 33 is then allowed to count up such as from 0 to 64 microseconds by means of a clock which may, for example, have a clock pulse at 500 kilohertz. Upon reaching a predetermined value such as 64 microseconds, counter 33 will provide an output on line 34 which is detected by rising edge detector 35 which generates a pulse which in turn resets counter 39, for example, to all zeros. Counter 39 is permitted to count up to a predetermined value such as 64 microseconds from a clock having a clock frequency of 500 kilohertz, for example. The output of counter 39 serves as the synchronized clock. Counter 39 will continue to free run or recycle through a predetermined count such as 64 microseconds at times encoded data on line 11 has a series of successive ones or zeros resulting in a steady output from phase detector 30.

In the event that no radio signal is received by antenna 14, intermediate frequency amplifiers 18 and 23 and hard limiter 25 will provide noise of a predetermined bandwidth to phase detector 30. The output of phase detector 30 will be a plurality of pulses which will be detected by edge detector 31. If the frequency of the pulses from phase detector 30 due to noise is above the frequency of the desired data, then counter 33 will be reset prior to reaching 64 microseconds or its full count. The frequency of the pulses due to noise may be adjusted by adjusting the bandwidth of intermediate frequency amplifier 18 and 23. For example, if the bandwidth is set at 120 kilohertz, then the typical frequency at the output of phase detector 30 would be in the range from 20 to 60 kilohertz. If counter 33 does not count up to the full 64 microseconds, then the output of rising edge detector 35 is 0.

Referring to FIG. 2, one embodiment of squelch circuit 49 is shown. The output of counter 33 or more particularly, the output of rising edge detector 35 is coupled over line 36 to the UP input of counter 61. The output of counter 39 is coupled over line 40 to the numerator input of divider 62. the denominator input which may be a constant is coupled over lines 63 and 64 to the demonator input of divider 62. For example, divider 62 may be set to divide by the integer 2. Divider 62 may be set up for dividing the frequency on line 40 by 2 by setting line 63 to +V volts and line 64 to 0 volts representative of a one and zero. The output of divider 62 is coupled over line 64 to the DOWN input of counter 61. Counter 61 responds to pulses on line 36 to count up. Counter 61 is limited in counting up to a predetermined value such as 10. Counter 61 responds to pulses on the down input to count the counter down. Counter 61 is limited in its down count to a predetermined value such as zero. The output of counter 61 is coupled over lines 66 through 69 to respective inputs of comparator 71. Comparator 71 also has inputs coupled over lines 72 and 73 representative of a value for which the value of the signal on lines 66 through 69 is compared. For example, line 72 may be coupled to +V volts and line 73 may be coupled to zero volts representative of a value of the integer 2. When the value on lines 66 through 69 the output value of counter 61 is less than the value on lines 72 and 73 such as the integer 2 then the output of comparator 71 will go low on line 51 which will inhibit the output data at AND gate 47.

Squelch circuit 49 compares by subtraction or dividing the frequency of the frequency of the output of rising edge detector 35 with the output of counter 39 which is free running to provide an inhibit signal on line 51. Squelch circuit 49 is adjusted by setting the denominator of divider 62 and the input on lines 72 and 73 to predetermined values to permit a predetermined number of successive zeros or ones in the data prior to inhibiting the output and for permitting a predetermined amount of time to pass when only noise is detected at the phase detector before providing an inhibit signal.

As may be seen in FIG. 1, counter 33 functions to prevent transitions or pulses from the output of phase detector 30 from affecting counter 39 by resetting counter 33 and only passing the output of counter 33 if it is permitted to count to a predetermined value.

An apparatus and method has been described for recovering binary data from an input signal wherein each bit of the data has a predetermined time interval and wherein first and second voltage levels represent a 1 and 0 of the data respectively, comprising an edge detector for detecting transitions in the data, a counter having a clock input coupled to an independent clock and interconnected to reset after counting to a predetermined value and having a reset input coupled to the output of the edge detector for resetting the counter at times a data transition from a 0 to 1 or vice versa is detected, a rising edge detector coupled to the output of the counter for generating a predetermined pulse which in turn is coupled to the reset input of a second counter for resetting the second counter. The second counter is interconnected to reset after counting up to a predetermined value and has a clock input coupled to an independent clock for counting, the output of the second counter provides a synchronized clock which may be used for decoding the data stream. A squelch circuit is provided for generating an inhibit signal as a function of the rate or frequency of the output of the first and second counter. The inhibit signal is indicative of receiving no valid data signal, indicative of receiving a data signal and excessive noise at the output of the phase detector resulting in unreliable data.

The invention claimed is:

1. Apparatus for recovering binary data from an input signal wherein each bit of said data has a predetermined time interval and wherein first and second voltage levels represent a 1 and 0 of said data respectively comprising:

first means for deriving a synchronized clock from said data synchronized with respect to said predetermined time intervals including a first edge detector, a first counter and a second counter, said first edge detector having an input adapted for coupling to said input signal, said first edge detector including means for detecting transitions between said first and second voltage levels and for generating an output signal in response to said detected transitions, said first counter having a clock input, a reset input, and an output, said first counter resetting itself after counting up to a first predetermined value, said output signal of said first edge detector coupled to said reset input of said first counter for resetting said first counter at times a transition is detected, said second counter having a clock input, a reset input, and an output, said second counter resetting itself after counting up to a second predetermined value, said output of said first counter coupled to said reset input of said second counter for resetting said second counter at times said first counter reaches a third predetermined value, each said clock input of said first and second counters being responsive to a respective clock signal of a predetermined frequency, said output of said second counter providing said synchronized clock, second means having a first input coupled to said input signal and having a second input coupled to said synchronized clock at said output of said second counter for generating binary data from said input signal at an output, third means coupled to said first and second means for inhibiting said output of said second means as a function of the output of said first and second counters indicative of a nonsynchronized clock.

2. The apparatus of claim 1 wherein said first, second, and third predetermined values are equal.

3. The apparatus of claim 1 wherein said second means includes a one bit delay line having an input coupled to said input signal and an output coupled to an AND gate having a second input coupled to said input signal and wherein the output of said second counter is coupled to a clock input of said delay line.

4. The apparatus of claim 1 wherein said third means for inhibiting includes generating an inhibit signal at times the ratio of the frequency of the output of said first counter to the frequency of the output of said second counter is below a predetermined constant.

5. The apparatus of claim 1 further including means for providing a noise signal having first and second voltage levels with transitions therebetween corresponding to hard limited noise coupled to said input of said first edge detector at times said input signal is nonexistent.

6. The apparatus of claim 1 further including a second edge detector coupled between said output of said first counter and said reset input of said second counter.

7. The apparatus of claim 6 wherein said second edge detector includes means for detecting rising edge transitions only.

8. The apparatus of claim 1 wherein said third means includes an up/down counter having an up input coupled the output of said first counter and a down input coupled to the output of a divider, said divider having a numerator input coupled to the output of said second counter.

9. The apparatus of claim 8 wherein said third means further includes a comparator having an input coupled to the output of said up/down counter and having an output coupled to said second means.

10. Apparatus for recovering binary data from a phase coded radio frequency signal wherein each bit of said data has a predetermined time interval and for inhibiting an output data signal at times said phase coded radio frequency signal is absent comprising:

a radio receiver including a mixer, an intermediate frequency amplifier having a predetermined bandwidth, a hard limiter and a phase detector coupled in series for providing first and second voltage levels corresponding to the phase of said data during said predetermined time intervals at times said phase coded radio frequency signal is received and for providing first and second voltage levels with transitions therebetween corresponding to hard limited noise at a frequency above the frequency of transitions between said first and second voltage levels arising from said binary data, first means for deriving a synchronized clock from said data synchronized with respect to said predetermined time intervals including a first edge detector, a first counter and a second counter, said first edge detector coupled to the output of said phase detector for detecting transitions between said first and second voltage levels and for generating an output signal in response to said detected transitions, said first counter having a clock input, a reset input, and an output, said first counter resetting itself after counting up to a first predetermined value, said output signal of said first edge detector coupled to said reset input of said first counter for resetting said first counter at times a transition is detected, said second counter having a clock input, a reset input, and an output, said second counter resetting itself after counting up to a second predetermined value, said output of said first counter coupled to said reset input of said second counter for resetting said second counter at times said first counter reaches a third predetermined value, each said clock input of said first and second counters being responsive to a respective clock signal of a predetermined frequency, said output of said second counter providing said synchronized clock, second means having a first input coupled to said input signal and having a second input coupled to said synchronized clock at said output of said second counter for generating binary data from said input signal at an output, third means coupled to said first and second means for inhibiting said output of said second means as a function of the output of said first and second counters indicative of a nonsynchronized clock.

11. The apparatus of claim 10 wherein said first, second, and third predetermined values are equal.

12. The apparatus of claim 10 wherein said second means includes a one bit delay line having an input coupled to said input signal and an output coupled to an AND gate having a second input coupled to said input signal and wherein the output of said second counter is coupled to a clock input of said delay line.

13. The apparatus of claim 10 wherein said third means for inhibiting includes generating an inhibit signal at times the ratio of the frequency of the output of said first counter to the frequency of the output of said second counter is below a predetermined constant.

14. A method for recovering binary data from an input signal wherein each bit of said data has a predetermined time interval and wherein first and second voltage levels represent a 1 and 0 of said data respectively comprising the steps of:

(1) deriving a synchronized clock from said data synchronized with respect to said predetermined time intervals, said deriving step further including subsequent steps (a)-(e)

(a) detecting transitions in said input signal between said first and second voltage levels and generating an output signal in response to said detected transitions, (b) counting a clock signal with a first counter having a clock input, a reset input and an output, resetting said first counter after it counts up to a first predetermined value, (c) resetting said first counter at times a transition is detected, (d) counting a clock signal with a second counter having a clock input, a reset input and an output and resetting itself after it counts up to a second predetermined value, (e) resetting said second counter at times said first counter reaches a third predetermined value, said output of said second counter providing said synchronized clock, (2) generating binary data from said input signal with the output of said second counter, and (3) inhibiting said generated binary data as a function of the outputs of said first and second counters indicative of a nonsynchronized clock.

15. Apparatus for deriving a synchronized clock from an input signal containing binary data wherein each bit of said data has a predetermined time interval and wherein first and second voltage levels represent a 1 or 0 of said data respectively comprising:

a first edge detector having an input adapted for coupling to said input signal, said first edge detector including means for detecting transitions between said first and second voltage levels and for generating an output signal in response to said detected transitions, a first counter having a clock input, a reset input, and an output, said first counter resetting itself after counting up to a first predetermined value, said output signal of said first edge detector coupled to said reset input of said first counter for resetting said first counter at times a transition is detected, and a second counter having a clock input, a reset input, and an output, said second counter resetting itself after counting up to a second predetermined value, said output of said first counter coupled to said reset input of said second counter for resetting said second counter at times said first counter reaches a third predetermined value, each said clock input of said first and second counters being responsive to a respective clock signal of a predetermined frequency, said output of said second counter providing said synchronized clock.

16. The apparatus of claim 15 wherein said first, second, and third predetermined values are equal.

17. The apparatus of claim 15 further including means for providing a noise signal having first and second voltage levels with transitions therebetween corresponding to hard limited noise coupled to said input of said first edge detector at times said input signal is non-existent.

18. The apparatus of claim 15 further including a second edge detector coupled between said output of said first counter and said reset input of said second counter.

19. The apparatus of claim 18 wherein said second edge detector includes means for detecting rising edge transitions only.

20. A method for deriving a synchronized clock from an input signal containing binary data wherein each bit of said data has a predetermined time interval and wherein first and second voltage levels repreent a 1 or 0 of said data respectively comprising the steps of:

detecting transitions in said input signal between said first and second voltage levels and generating an output signal in response to said detected transitions, counting a clock signal having a predetermined frequency with a first counter having a clock input, a rest input and an output, resetting said first counter after it counts up to a first predetermined value, resetting said first counter at times a transition is detected, counting a clock signal having a predetermined frequency with a second counter having a clock input, a reset input and an output and resetting itself after it counts up to a second predetermined value, and resetting said second counter at times said first counter reaches a third predetermined value, said output of said second counter providing said synchronized clock.

* * * * *